May 28, 1963 S. D. NOBLE 3,091,304
SCALE
Filed Oct. 16, 1961

INVENTOR.
STUART D. NOBLE
BY
Beehler & Shanahan
ATTORNEYS

United States Patent Office 3,091,304
Patented May 28, 1963

3,091,304
SCALE
Stuart D. Noble, Los Angeles, Calif., assignor of ten percent to Vernon D. Beehler, Los Angeles, Calif.
Filed Oct. 16, 1961, Ser. No. 145,047
4 Claims. (Cl. 177—229)

The invention relates to weighing devices and particularly a very small, light-weight scale, capable of determining the weight of relatively light-weight objects weighing no more than a few ounces.

More specifically, the invention relates to a simple, small and compact scale of such size that it could, if need be, readily be carried in the pocket.

Although there exists a great variety of weighing scales capable both of measuring the weight of sundry devices very exactly as well as measuring the weight only approximately and even though there has been some effort directed to the construction of scales specially designed for only light-weight work, even the more simple of the devices of this general nature are constructed of a relatively great number of parts associated together in such fashion that the resulting product is invariably relatively high-priced and invariably one having numerous parts arranged in such fashion that they are prone to get out of order unless the scale is handled with a considerable degree of care. It is also true that even the simpler devices directed to the measuring of light-weight objects are somewhat bulky and of such character that they occupy a considerable amount of space considering the fact that objects of only a few ounces are to be weighed upon them.

It is therefore among the objects of the invention to provide a new and improved extremely light-weight weighing scale of a simple and compact type capable of adequately measuring the weight of the devices which may weigh as little as one, two or three ounces.

Another object of the invention is to provide a new and improved light-weight weighing scale wherein the number of parts has been reduced to virtually a minimum with certain parts serving a multiple purpose so that an extraordinarily inexpensive scale is made possible.

Still another object of the invention is to provide a new and improved light-weight weighing scale which is flat and compact and which can be used with considerable convenience in weighing objects such as letters and envelopes of various kinds, the device being sufficiently compact to permit it to be stored, for example, in a desk drawer with pencils and other paraphernalia and also one which is of a sufficiently rugged and durable character to permit frequent handling and shuffling about without impairing its dependability.

Still another object of the invention is to provide a new and improved light-weight weighing scale which in addition to being simple and compact, also presents flat areas adjacent graduations in ounces, grams, or other weights, whereon legend material may appear, such for example as directions for mailing, advertising, and the like, visible in the same general area as the graduations indicative of weight.

Still further among the objects of the invention is to provide a new and improved weighing scale of a leaf spring type which is extremely sensitive to light weights but which is proof against damage which might result from attempting to weigh objects too heavy for the scale and further one which is capable of being constructed of extremely inexpensive materials, such as cardboard or plastic.

With these and other objects in view, the invention consists in the construction, arrangement and combination of the various parts of the device, whereby the objects contemplated are attained, as hereinafter set forth, pointed out in the appended claims and illustrated in the accompanying drawings.

In the drawings:

FIGURE 3 is a cross-sectional view taken on the line 3—3 of FIGURE 1.

Figure 1:
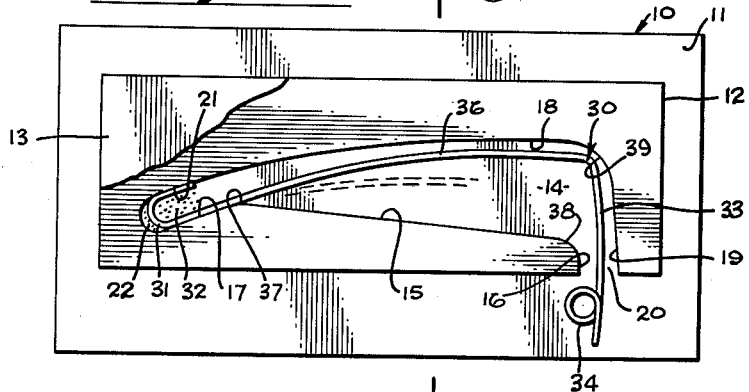
FIGURE 1 is a plan view of one form of the device by way of example, showing the cover removed in order to reveal the structure and operation of the working parts.
Figure 2:
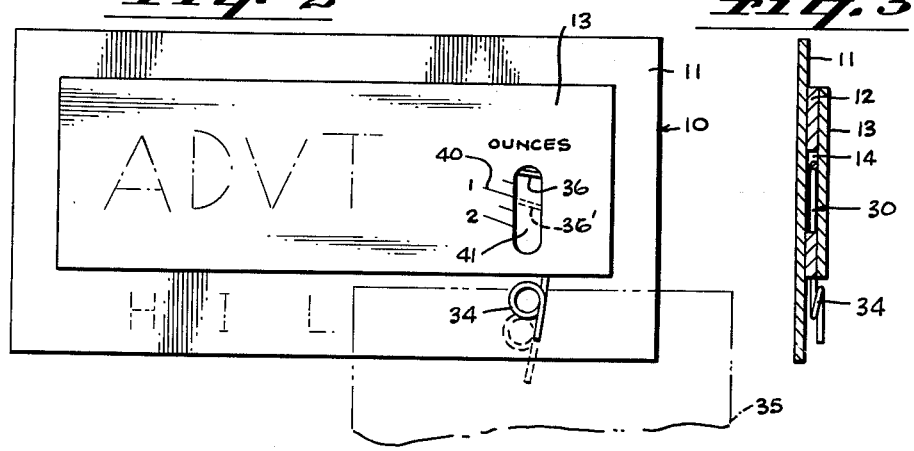
FIGURE 2 is a plan view of the device set up and ready for a weighing operation.
Figure 4:
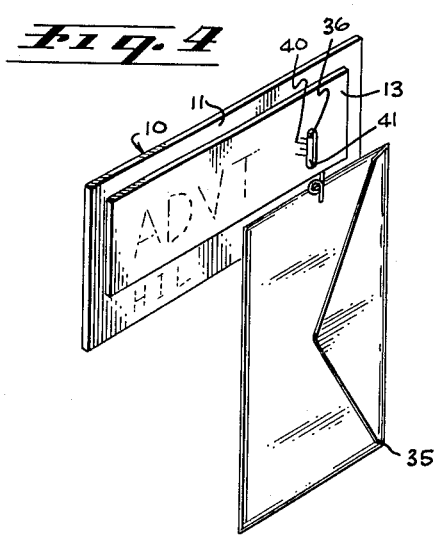
FIGURE 4 is a front perspective view of the device with an ordinary envelope attached in position for weighing.

In the form of the invention of FIGURES 1, 2, 3 and 4 there is shown a body assembly 10 constructed of a base or backing card 11 upon which a filler sheet 12 is fastened by some convenient means as, for example, by gluing. In this form of device the filler sheet is somewhat smaller than the backing card, leaving a margin of the backing card showing around the perimeter of the filler sheet. A cover 13 is applied over the filler sheet and forms a covering for a recess 14 formed in the filler sheet.

More particularly, walls forming the recess 14 consist in part of a lower wall element 15 having an outer end 16 and an inner end 17. An upper wall element 18 has an outer end 19 spaced from the outer end 16 and providing between them an end opening 20 which, as shown in FIGURE 1 and as normally used, extends in a downward direction. An inner end 21 is spaced from the inner end 17 previously described and forms between them a pocket 22.

The weighing element consists of a single wire of spring material forming a spring indicated generally by the reference character 30. The spring is somewhat specially formed in that there is provided at the inner or left-hand end as viewed in FIGURE 1 an anchoring loop 31 which fits snugly within the pocket 22 in a position bearing against the inner end 17 on one side and the inner end 21 on the other side. A mass of adhesive 32 may be applied to the spring at its location in the pocket so as to securely anchor the spring in place.

At the opposite end of the spring is a weight-supporting arm 33 which extends downwardly and outwardly through the end opening 20. A spring loop 34 at the outer end of the arm 33 is located entirely outside of the end opening 20 and may be used as a spring retainer for some object to be weighed as, for example, an envelope 35. The weight-resisting reach is of substantial length which will depend to a degree upon the gauge of the spring wire from which the spring is constructed and also the weight of objects which are planned to be weighed by the scale. To give the spring the degree of accuracy needed, a rounded shoulder 37 near the left end of the lower wall element 15 is provided which serves as a fulcrum about which the weight-resisting reach can bend. A shoulder 38 at the opposite end provides a stop against which the opposite end of the weight-resisting reach can rest at the maximum position of deflection. A rounded inside section 39 of the upper wall element 18 serves as a stop or abutment against which the spring may be pressed when an object is being attached to the spring loop 34. Graduation marks 40 are located on one side of a window 41 and in the chosen embodiment these marks show weight in ounces. A capacity of slightly more than two ounces is indicated. It will be appreciated, however, that this is exemplary only and that the graduations may be in units other than ounces as, for example, grams and may be made to cover a range substantially in excess of two or three ounces and may also include subgraduations to accurately indicate fractions of ounces or fractions of grams as the case may be.

In operation after the spring 30 has been mounted as indicated and the cover 13 fastened in place by an appropriate adhesive or other appropriate means, the device is ready for use. Where there is employed a spring loop like the spring loop 34, the envelope 35 may be pressed into engagement with the spring loop. This naturally will extend the weight-supporting arm 33 inwardly but it will abut against the inside section 39 and cannot be forced too far so as to in any way damage the spring. The body assembly then is supported by hand and the spring is permitted to carry the envelope. As the weight of the envelope is impressed upon the spring, it will be drawn downwardly from the solid line position of FIGURE 2 to a dotted line position 36'. In this position the weight-resisting reach 36' of the spring actually serves as the weight indicator in that its position opposite one or another of the graduations 40 indicates the weight of the object which is being weighed. Should the object weigh more than the few ounces for which the scale is calibrated, the weight-resisting reach 36 will merely be moved downwardly until it abuts against the rounded shoulder 38, at which point it can move no further. In this way, damage to the spring is avoided by an attempt to weigh objects which are too heavy. If the object in fact is especially heavy, it will merely pull loose from the spring loop 34 after the reach strikes the rounded shoulder 38, thereby avoiding any prospect of damage to the device.

Figure 5:
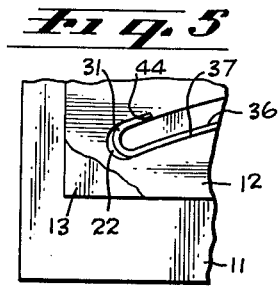
FIGURE 5 is a fragmentary plan view of a modified form of the device.

In the form of invention suggested by FIGURE 5, adhesive is dispensed with. To further improve anchoring the loop 31 in the proper position a shoulder 44 is provided at one end of the pocket 22. By giving the loop a form such that it springs outwardly and into a form slightly larger than the pocket 22, it can readily be snapped in position so that the end of the spring bears against the shoulder 44 to securely anchor the spring in place. After the cover 13 has been applied, the spring will remain firmly secured in position without need for employment of any adhesive.

Figure 6:
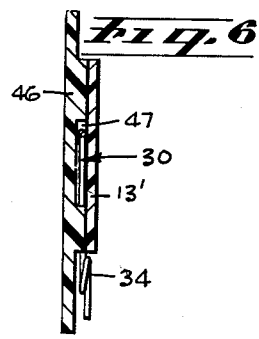
FIGURE 6 is a cross-sectional view similar to FIGURE 3 but showing the device constructed of slightly different material wherein parts of the basic structure have been combined.

As a further convenience in the form of invention of FIGURE 6, the backing card and filler sheet have been combined into a single base element 46. The base element has appreciable thickness in order to permit formation of a recess 47 having the same relative shape, size and proportions as the recess 14 heretofore described sufficient that further detailed description of the wall elements, the rounded shoulders and the end opening is felt not to be warranted. A cover 13' is applied in the same fashion as has been described in connection with the cover 13, thereby to complete the enclosure of the spring 30 in either the manner described in connection with FIGURES 1 through 4, inclusive, or as described in connection with FIGURE 5.

When constructed as shown and described herein, the entire body assembly may be a flat piece no more than a fraction of an inch thick at the thickest portion and as small as one or two inches wide and three or four inches long. Moreover, being constructed of only three or four pieces, as the case may be, simply and positively formed by use of appropriate dies, a dependably accurate weighing device is made possible at a cost which is extremely low considering the dependability involved.

While the invention has herein been shown and described in what is conceived to be the most practical and preferred embodiment, it is recognized that departures may be made therefrom within the scope of the invention, which is not to be limited to the details disclosed herein but is to be accorded the full scope of the claims so as to embrace any and all equivalent devices.

Having described the invention, what is claimed as new in support of Letters Patent is:

1. A scale for relatively light-weight objects comprising a mounting base of relatively thick sheet material having a recess in one face of said material and extending outwardly at an edge thereof, and a cover overlying said face and closing a side of said recess, wall elements forming said recess comprising a lower wall element having an outer end extending outwardly and downwardly of the recess and an inner end, an upper wall element having an outer end extending outwardly and downwardly at a location spaced from said first outer end forming a downwardly extending opening for said recess, and an inner end of said upper wall element at a location spaced from the inner end of said lower wall element and forming therewith a pocket, and a spring comprising a single length of spring material having an inner end formed in an anchoring loop impressed in said pocket, said spring having an object supporting arm extending from said recess through said end opening to the exterior, and a weight-sensitive reach of said spring connecting said loop to said arm.

2. A scale for relatively light-weight objects comprising a mounting base having a recess therein and a cover overlying and closing a side opening of said recess, wall elements forming said recess comprising a lower wall element having an outer end extending outwardly and downwardly of the recess and an inner end, an upper wall element having an outer end extending outwardly and downwardly at a location spaced from said first outer end forming a downwardly extending opening for said recess, and an inner end of said upper wall element at a location spaced from the inner end of said lower wall element and forming therewith a pocket, and a spring comprising a continuous length of spring material having an inner end formed in an anchoring loop impressed in said pocket, said spring having an object supporting arm extending from said recess through said end opening to the exterior, and a weight-sensitive reach of said spring connecting said loop to said arm, said lower wall element having a shoulder adjacent the pocket forming a fulcrum for one end of said reach, said fulcrum being in engagement with a lower side of said reach at a location removed a substantial distance from the loop and leaving a portion of said reach between the loop and the fulcrum unsupported on the upper side thereof, said reach having another shoulder adjacent said opening forming a stop for limiting maximum deflection of said reach.

3. A scale for relatively light-weight objects comprising a mounting base having a recess and a cover overlying and closing a side opening of said recess, wall elements forming said recess comprising a lower wall element having an outer end extending outwardly and downwardly of the recess and an inner end, an upper wall element having an outer end extending outwardly and downwardly at a location spaced from said first outer end forming a downwardly extending opening for said recess, and an inner end of said upper element spaced from the inner end of said lower wall element and forming therewith a pocket, and a spring comprising a wire of spring material having an inner end formed in an anchoring loop impressed in said pocket, said wire having an object supporting arm extending from said recess through said end opening to the exterior and having a spring loop at the exterior for releasable attachment of the object, and a weight-sensitive reach of said spring connecting said loop to said arm, said lower wall element having a shoulder adjacent the pocket forming a fulcrum for one end of said reach and having another shoulder adjacent said opening forming a stop for limiting maximum deflection of said reach, a portion of said upper wall element being adjacent the top of said supporting arm for limiting inward movement of said spring when an object is pushed into engagement with the spring loop of said arm.

4. A scale for relatively light-weight mailing envelopes comprising a supporting card having a recess on one face thereof and a cover overlying and closing a side of said recess, wall elements forming said recess comprising a lower wall element having an end extending outwardly and downwardly of the recess and an end extending inwardly, an upper wall element having an end extending outwardly and downwardly at a location spaced from said first end forming a downwardly extending opening for said recess and an inner end of said upper wall element extending inwardly at a location spaced from the inner end of said lower wall element and forming therewith a pocket at the inner end of said recess, and a spring comprising a wire of spring material having an inner end formed in an anchoring loop having outer portions of the loop impressed in said pocket and a mass of adhesive material within the loop and adhering to adjacent portions of the supporting card anchoring said loop in said pocket, said wire having an object supporting arm extending from said recess through said downwardly extending opening to the exterior and having a spring loop at a location exterior with respect to the recess for releasable attachment of the envelope, a weight-sensitive reach of said spring connecting said loop to said arm, said lower wall element having a rounded shoulder adjacent the pocket forming a fulcrum for one end of said reach and having another rounded shoulder adjacent said opening forming a stop for limiting maximum deflection of said reach, said upper wall element having a rounded inside section adjacent the top of said supporting arm for limiting inward movement of said reach when an envelope is pushed into engagement with the spring loop of said arm.

References Cited in the file of this patent

UNITED STATES PATENTS

| | | |
|---|---|---|
| 2,523,492 | Berry | Sept. 26, 1950 |
| 2,697,595 | Walter | Dec. 21, 1954 |

FOREIGN PATENTS

| | | |
|---|---|---|
| 1,010,572 | France | June 12, 1952 |